US006910020B2

(12) United States Patent
Oyama et al.

(10) Patent No.: US 6,910,020 B2
(45) Date of Patent: Jun. 21, 2005

(54) APPARATUS AND METHOD FOR GRANTING ACCESS TO NETWORK-BASED SERVICES BASED UPON EXISTING BANK ACCOUNT INFORMATION

(75) Inventors: Shuji Oyama, Kawasaki (JP); Akira Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/825,565

(22) Filed: Mar. 31, 1997

(65) Prior Publication Data

US 2002/0007343 A1 Jan. 17, 2002

(30) Foreign Application Priority Data

Oct. 16, 1996 (JP) .......................................... 08-273153

(51) Int. Cl.⁷ .............................................. G06F 17/60
(52) U.S. Cl. .............................. 705/38; 705/50; 705/71; 705/76; 380/232; 380/228; 713/200; 713/201
(58) Field of Search ............................. 705/35, 38, 42, 705/44, 64, 74, 76, 39, 70, 71; 235/379, 380; 380/24, 25, 49

(56) References Cited

U.S. PATENT DOCUMENTS

| | | | | |
|---|---|---|---|---|
| 5,193,057 | A | * | 3/1993 | Longfield |
| 5,606,496 | A | * | 2/1997 | D'Agostino |
| 5,703,949 | A | * | 12/1997 | Rosen |
| 5,765,144 | A | * | 6/1998 | Larche et al. |
| 5,790,665 | A | * | 8/1998 | Micali |
| 5,797,133 | A | * | 8/1998 | Jones et al. |
| 5,859,419 | A | * | 1/1999 | Wynn |
| 5,866,889 | A | * | 2/1999 | Weiss et al. |
| 5,870,721 | A | * | 2/1999 | Norris |
| 5,878,403 | A | * | 3/1999 | DeFrancesco et al. |
| 5,911,135 | A | * | 6/1999 | Atkins |
| 6,354,490 | B1 | * | 3/2002 | Weiss et al. ................. 235/379 |
| 2001/0002468 | A1 | * | 5/2001 | Nel ............................. 705/26 |

FOREIGN PATENT DOCUMENTS

| | | |
|---|---|---|
| JP | 02-287767 | 11/1990 |
| JP | 402287767 A | * 11/1990 |
| JP | 08-235277 | 9/1996 |

OTHER PUBLICATIONS

"Community Group Keeps Watchful Eye on Goldome", American Banker, p. 6, Feb. 26, 1990.*

(Continued)

*Primary Examiner*—Firmin Backer
(74) *Attorney, Agent, or Firm*—Staas & Halsey LLP

(57) ABSTRACT

A network transaction system applicable to cyberspace banking services using an open network, which allows customers to authenticate themselves through a simplified procedure. A customer's terminal station and a plurality of bank systems are interconnected via networks, and it is assumed that the customer wishes to newly open a bank account in a bank system among them, or a target bank system, and that the customer has an existing bank account in a different bank system, or an cooperative bank system. Using his/her terminal station, the customer applies for a new bank account by supplying the target bank system with a ciphertext message containing existing account information descriptive of the customer's bank account in the cooperative bank system. The target bank system requests the cooperative bank system to confirm the customer's existing bank account, while forwarding thereto a part of the ciphertext message containing the existing account information. The cooperative bank system decrypts the received message and confirms the validity of the account that the customer claims to own. It then returns a response message to the target bank system to report the result of the account confirmation. The target bank system decides whether to accept or to reject the application for a new account based on the response message from the cooperative bank system.

6 Claims, 7 Drawing Sheets

OTHER PUBLICATIONS

Thoren–Paden et al., "Compliance Issues in Cyberspace", ABA Bank Compliance, V17N5, pp12–22, May 1996.*

"How Institutions Can Prepare for "Know Your Customer" Regs", Money Laundering Alert, V5N4, Jan. 1994.*

"SCAN OnLine Defines New Era in the Fight Against Check Fraud", PR Newswire, Sep. 1996.*

"Fed's Examiners Get Roadmap to KYC Weaknesses in Banks", Money Laundering Alert, vol. 6, No. 7, Apr. 1995.*

"Banks Run Risk of BSA, OFAC Dangers in Cyberbanking", Money Laundering Alert, Oct. 1, 1996.*

English–language translation of relevant parts of Japanese Laid–open No. 2–287767 (Makoto), 1 page.

* cited by examiner

FIG. 5

APPARATUS AND METHOD FOR GRANTING ACCESS TO NETWORK-BASED SERVICES BASED UPON EXISTING BANK ACCOUNT INFORMATION

BACKGROUND OF THE INVENTION

1. Field of the Invention

The present invention generally relates to network transaction systems, and more specifically, to a network transaction system applicable to the entire range of cyberspace banking services including new account application, account balance summary, transaction summary, fund transfer, and bill payment. The present invention further relates to a network transaction system applicable to other industries having a closed network for mutual communications, such as credit card services.

2. Description of the Related Art

Home banking systems have been developed as new strategic services in the finance industry, which will allow a customer to electronically access to their individual bank accounts by connecting his/her home terminal to a central computer of the bank. Customers can enjoy various online banking services such as transaction summary review and fund transfer. To receive those services from the present home banking systems, each customer must have his/her bank account opened beforehand through a traditional, or non-electronic, procedure. That is, a customer should visit the bank and sign up for opening a bank account, where he/she will be usually requested to show something to identify that he/she is really who he/she claims to be. This security process is called a user authentication procedure, and the customer has to pass through this gateway every time he/she newly applies for an account of a different bank.

Some financial institutions are proposing such online banking systems that will provide more advanced services using open network environment such as Internet. Those proposed systems allow their customers to sign up for opening a bank account without visiting the bank. Instead, customers can use a virtual branch of the bank disposed on their personal computer platforms that are linked to some bank systems providing online services. Such banking systems are called cyberspace banking.

Since every service is provided online in such cyberspace banking systems, the user authentication plays an indispensable roll in security management. How to perform the online user authentication is, therefore, of greater importance in recent years.

The use of certifying authorities is proposed as a solution to the above problem. According to this idea, a certifying authority established on a network will issue an electronic certificate that vouches for the bearer's identity. To get an electronic certificate, users must register their personal data to the authority by sending a mail message or visiting its registration office. This requirement, however, is quite troublesome to the users. When compared with conventional methods, the proposed authentication method has no big difference in the initial expense in time and effort for the customers to get a certificate.

Also, from the viewpoint of the banks offering home banking services, the presence of certifying authorities will cause an additional burden on them. They might ask the following questions: "Who will take the initiative in operating the certifying authority?" "Does each bank separately establish such a certifying body?" "Or will it be a unified body to be shared by all the financial institutions involved?" Unfortunately, there seems to be no clear answers to those questions. In reality, however, every cyberspace banking system that is experimentally running now assumes the use of certifying authorities and electronic certificates issued from them for user authentication.

A virtual branch is defined as a terminal platform which is virtually set up on each user's personal computer. When this concept is realized, the users will be able to enjoy a wider range of banking services and business transactions than those offered from the present home banking systems.

To make this cyberspace banking commercially operational, it is necessary to solve the troublesomeness imposed to the users in getting an electronic certificate and to eliminate the tasks related to certifying authorities that the banks must deal with. Unless users can easily open an account in their desired banks, the new systems will never be accepted by them.

SUMMARY OF THE INVENTION

Taking the above into consideration, an object of the present invention is to provide a network transaction system which will allow a user to authenticate himself or herself without using certifying authorities and to receive various cyberspace banking services from any banks as long as they are linked via an inter-bank network.

To accomplish the above object, according to the present invention, there is provided a network transaction system in which a customer's terminal station and a plurality of bank systems are interconnected via networks. In such a network banking environment, the customer wishes to newly open a bank account in a first bank system, while having an existing bank account in a second bank system. The first and second bank systems are among the plurality of bank systems on the networks.

The network transaction system of the present invention comprises the three structural elements: customer processing means, first bank processing means, and second bank processing means. The customer processing means, which is disposed at the terminal station, applies for a new bank account by supplying the first bank with existing account information descriptive of the existing bank account owned by the customer in the second bank system. The first bank processing means, which is disposed at the first bank system, requests the second bank system to make a confirmation of the existing bank account, while forwarding the existing account information received from the customer processing means to the second bank system over the networks. The second bank processing means, which is disposed at the second bank system, confirms the existing bank account upon request from the first bank processing means and returns a confirmation response message to the first bank processing means to report the result of the confirmation of the existing bank account. The first bank processing means opens the applied new bank account based on the confirmation response message from the second bank system describing the result of the confirmation of the existing bank account.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing an example of a terminal screen used by a customer when applying for a new account;

DESCRIPTION OF THE PREFERRED EMBODIMENT

Figure 1:
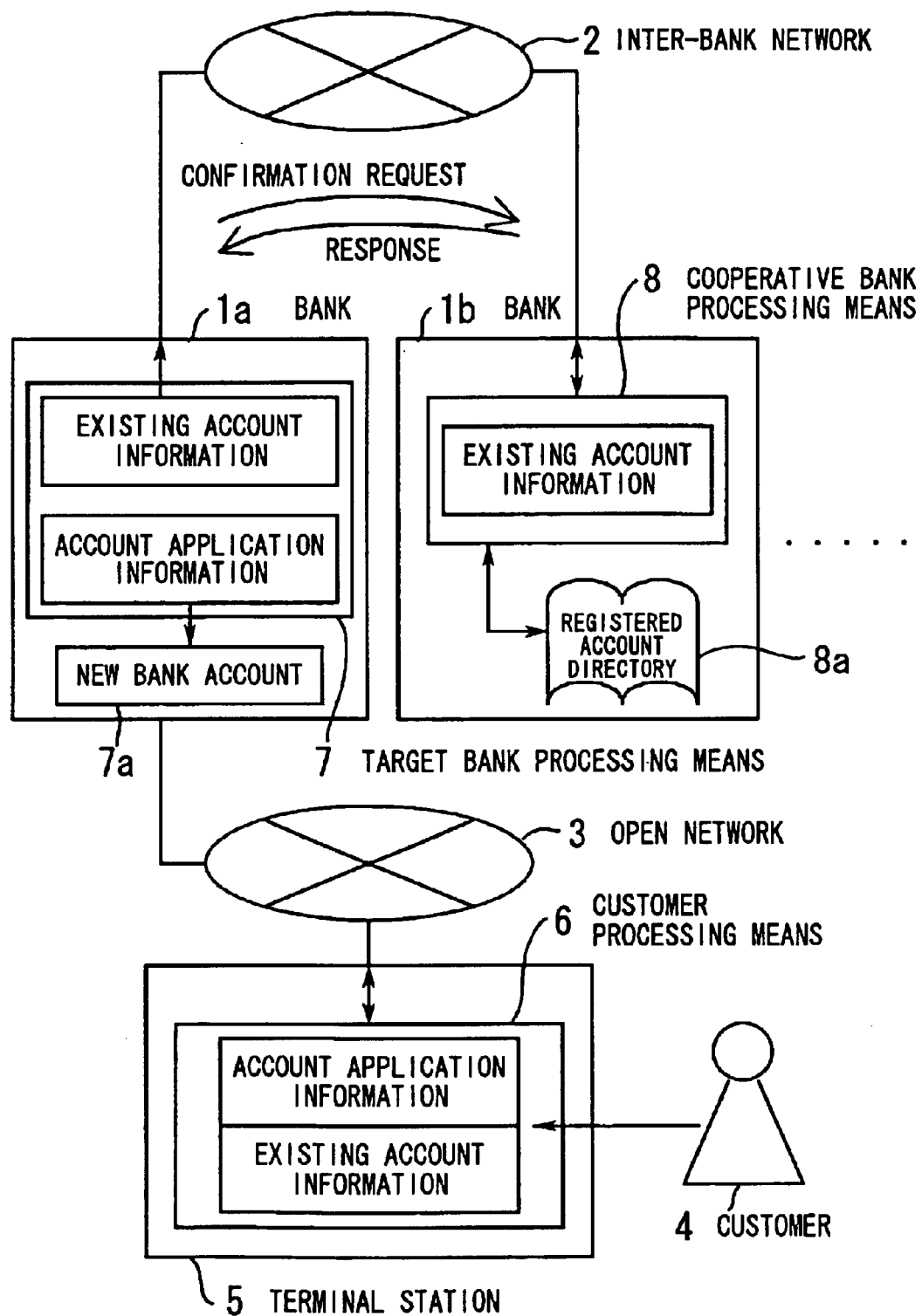
FIG. 1 is a conceptual view of a network transaction system according to the present invention.

An embodiment of the present invention will be described below with reference to the accompanying drawings. Referring first to FIG. 1, the following description will outline the principle of the present invention.

FIG. 1 is a conceptual view of a network transaction system according to the present invention. The network transaction system of the present invention is implemented in a network environment where a plurality of banks 1a, 1b, and so on are interconnected via a conventional inter-bank network 2. The bank la is offering cyberspace banking services using an open network 3 to communicate with their potential customers. A terminal station 5 of a customer 4 is linked to this bank la via the open network 3. The customer 4 wishes to have an account in the bank 1a, and in this sense, the bank la is referred to as a "target bank."

Meanwhile, the customer 4 owns his/her bank account in another bank 1b which has been previously opened. Because this bank 1b will play an important role in the present invention, cooperating with the target bank la as will be described below, the bank 1b is referred to as a "cooperative bank."

Every bank in this system can be uniquely identified with a bank identification code. The "target bank identification code" and "cooperative bank identification code" refer to the codes of the target bank la and cooperative bank 1b, respectively.

The network transaction system of the present invention comprises customer processing means 6, target bank processing means 7, and cooperative bank processing means 8, which are disposed in separate locations. The customer processing means 6 is placed in a personal computer, for example, that serves as the terminal station 5. The target bank processing means 7 is located in the target bank 1a, and the cooperative bank processing means 8 is disposed in the cooperative bank 1b.

Sitting at the terminal station 5, the customer 4 is now attempting to issue an application for an account of the bank 1a for the first time. The customer 4 is prompted to enter some personal information necessary for opening a new account, which information is referred to as "account application information." This account application information includes: name, address, desired password, and so on. The customer 4 enters such information items to the customer processing means 6 of the terminal station 5.

The customer 4 is also requested to enter "existing account information" that describes one of the bank accounts that the customer 4 currently holds. This existing account information actually includes: cooperative bank identification code, account number, password, and the like. Upon receipt of the account application information and existing account information, the customer processing means 6 transmits them all to the target bank 1a over the open network 3.

In the bank 1a, the target bank processing means 7 receives the account application information and existing account information transmitted from the customer processing means 6. The target bank processing means 7 then forwards the received existing account information to the bank 1b where the customer's bank account resides, thereby requesting the cooperative bank processing means 8 to make a confirmation of the identity of the customer 4. This authentication request, or actually an account confirmation request, is delivered to the bank 1b over the inter-bank network 2.

The cooperative bank processing means 8 in the bank 1b receives the existing account information and compares it with the entries of a registered account directory 8a stored therein, thereby confirming that the customer's account is registered as claimed in the existing account information. The result of this account confirmation is sent back to the bank 1a via the inter-bank network 2.

The target bank processing means 7 in the bank 1a receives this response from the cooperative bank processing means 8. Based on this response, the target bank processing means 7 decides whether to create or not to create an account for the customer 4. When the target bank processing means 7 decided to allow opening the customer's account, it sends "new account acknowledgment information" to the terminal station 5 to notify the customer 4 of acceptance of his/her application. The target bank processing means 7 then creates a new bank account 7a in the bank 1a, using the account application information that was sent from the terminal station 5 when the customer 4 issued the application.

In the way described above, the customer 4 can newly open an account of the bank la without visiting a branch office of the bank 1a, but only by entering necessary information to his/her terminal station 5. Note here that the bank 1a used the customer's existing account in the different bank 1b to authenticate the applicant, or the customer 4. This method will eliminate the need of special certifying authorities and simplify the account opening procedure.

This method originates from the concept that a customer who has a valid account in one of the banks on the network must have once passed a normal user authentication procedure. As long as the validity of his/her bank account can be confirmed, there will be no need to repeat a like procedure each time a new application is issued from the same customer. The bank account used for such authentication purposes is not restricted to one registered in a specific bank, but can be of any banks linked to the target bank la via the inter-bank network 2.

The target bank 1a, of course, can also play as a cooperative bank if the customer has a valid account in the bank 1a. In this case, the target bank processing means 7 will make an account confirmation by itself. Besides being applicable to new account applications, the network transaction system of the present invention can be used in general banking transactions such as online inquiry of the account balance summary. Those two cases will be described separately as alternative configurations of the present invention.

The following description will present an embodiment of the present invention, in which a cyberspace banking system is constructed on an open network such as Internet. When trying to open a new account in a certain bank, the customer must follow either one of two different procedures depending on whether he/she already has an account in that bank or not. The following description will start with an assumption that the customer currently has no account in the target bank.

Figure 2:
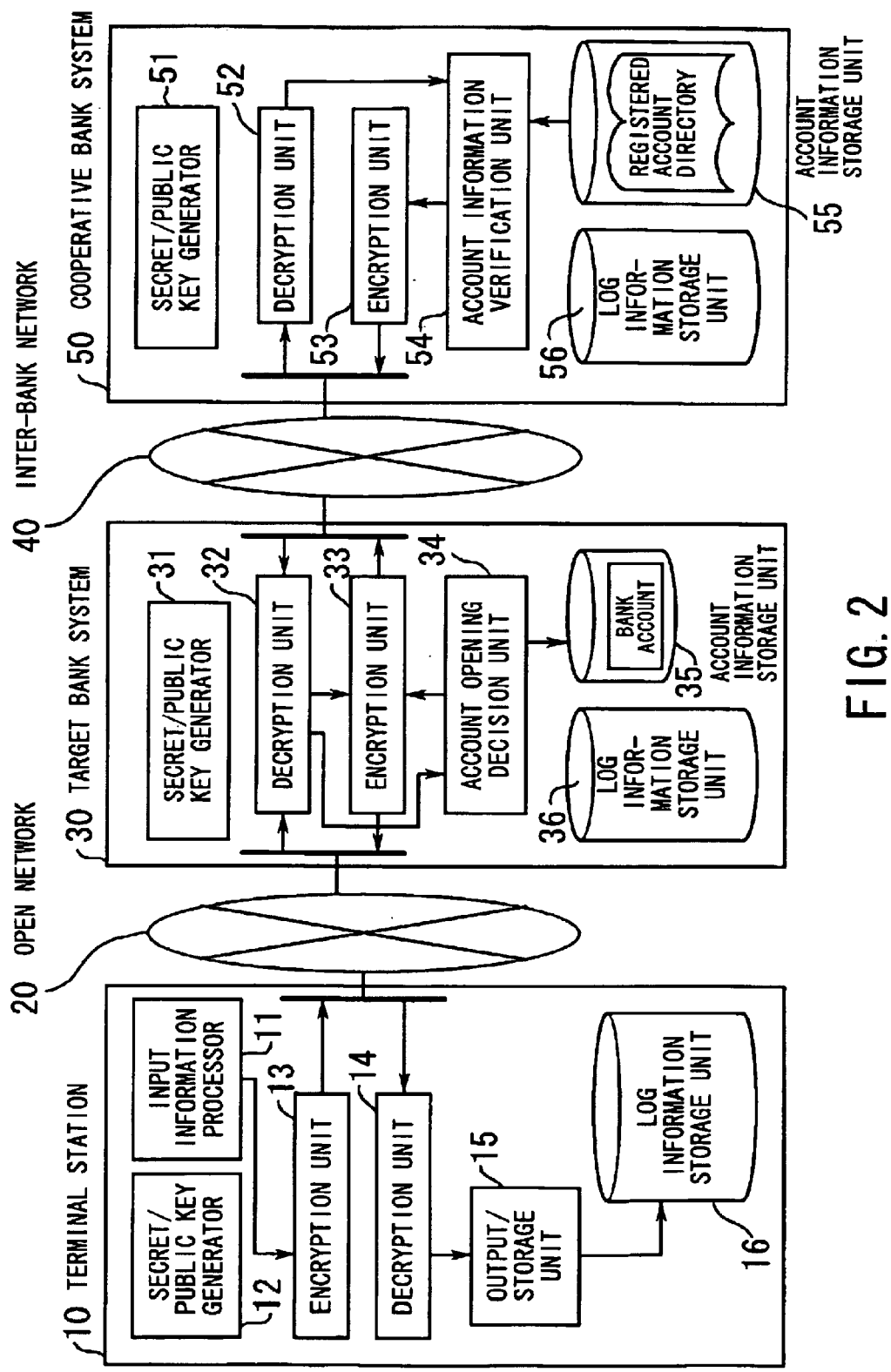
FIG. 2 is a block diagram showing a typical configuration of a cyberspace banking system where a network transaction system according to the present invention is implemented.

FIG. 2 is a block diagram showing a typical configuration of a cyberspace banking system according to the present invention. As in FIG. 1, the system shown in FIG. 2 contains three entities; a terminal station 10, a target bank system 30, and a cooperative bank system 50. Via an open network 20 such as Internet, the terminal station 10 at the customer's site is linked to the target bank system 30 disposed in the bank where the customer wishes to open an account. The target bank system 30 is further linked to the cooperative bank system 50 via a proprietary inter-bank network 40, in which the customer's existing bank account is registered.

The terminal station 10 comprises an input information processor 11, a secret/public key generator 12, an encryption unit 13, a decryption unit 14, an output/storage unit 15, and a log information storage unit 16. The input information processor 11 handles information entered by the customer through a keyboard and/or other input devices. The secret/public key generator 12 produces a customer secret key and a customer public key for encryption and decryption of communication messages using a public key cryptosystem. The encryption unit 13 encrypts the entered information and sends the encrypted message to the target bank system 30. The decryption unit 14 receives a response message from the target bank system 30 and decrypts them so that the output/storage unit 15 will display, print out, and/or store the information contained in the message. The log information storage unit 16 stores operation history records of the terminal station 10.

The target bank system 30 comprises a secret/public key generator 31, a decryption unit 32, an encryption unit 33, an account opening decision unit 34, an account information storage unit 35, and a log information storage unit 36. The secret/public key generator 31 produces a target bank secret key and a target bank public key. The decryption unit 32 decrypts a request message from the terminal station 10 and a response message from the cooperative bank system 50. The encryption unit 33 encrypts a confirmation request message and sends it to the cooperative bank system 50, as well as encrypting and transmitting a response message to the terminal station 10. The account opening decision unit 34 decides whether to accept or to reject a customer's request for new account, based on the information decoded by the decryption unit 32. The account information storage unit 35 stores information regarding the bank accounts. The log information storage unit 36 records the operation history in the target bank system 30.

The cooperative bank system 50 comprises a secret/public key generator 51, a decryption unit 52, an encryption unit 53, an account information verification unit 54, an account information storage unit 55, and a log information storage unit 56. The secret/public key generator 51 produces a cooperative bank secret key and a cooperative bank public key. The decryption unit 52 decrypts a confirmation request message from the target bank system 30. The encryption unit 53 encrypts a response message addressed to the target bank system 30. The account information verification unit 54 confirms the validity of a bank account that the customer claims to own. The account information storage unit 55 stores directory information regarding the registered bank accounts. The log information storage unit 56 stores the operation history in the cooperative bank system 50.

Figure 3:
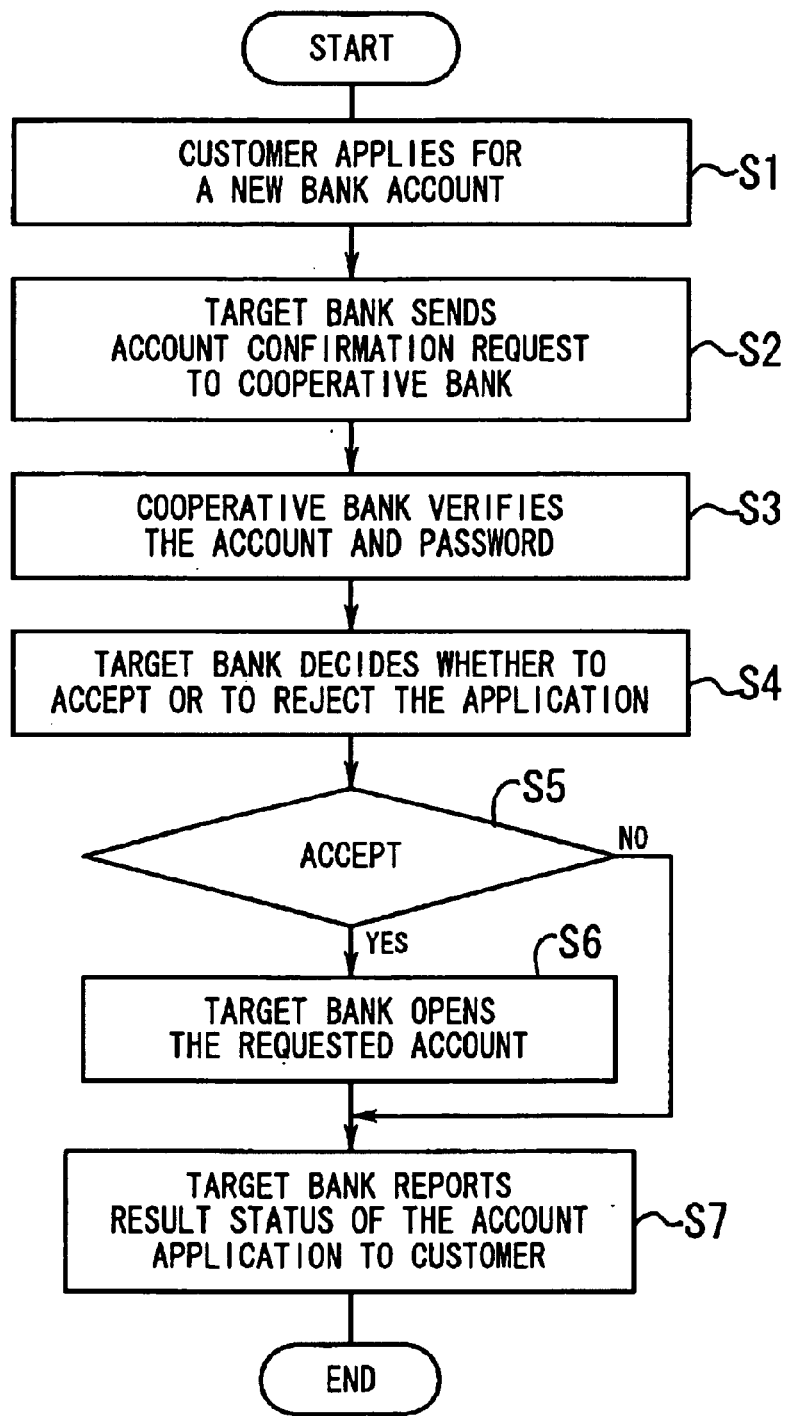
FIG. 3 is a flowchart showing a procedure of opening a new bank account.

The above components in the terminal station 10, target bank system 30, and cooperative bank system 50 will cooperate with each other to perform a secure process to open a new account for the customer. Referring now to FIG. 3, the following description will totally present the process of opening a new bank account.

FIG. 3 is a flowchart showing the account opening process, which comprises seven steps S1–S7 as follows.

[S1] In the terminal station 10, the input information processor 11 receives some personal information from the customer. More specifically, the customer enters two classes of information as:

(a) Information required for opening a new bank account, such as his/her name and address, and (b) Information on his/her existing bank account, including its account number and password.

The former information (a) is referred to as "account application information," while the latter information (b) is referred to as "existing account information" or "user authentication data." The encryption unit 13 encrypts those two kinds of data to assemble an account application message and sends it to the target bank system 30.

[S2] In the target bank system 30, the decryption unit 32 receives the account application message from the terminal station 10 and decodes the message to extract both the account application information and the user authentication data. The encryption unit 33 then creates a confirmation request message from the extracted user authentication data, and sends it to the cooperative bank system 50.

[S3] In the cooperative bank system 50, the decryption unit 52 receives the confirmation request message from the target bank system 30. Decoding that message, the decryption unit 52 obtains the user authentication data. The account information verification unit 54 then searches the directory information stored in the account information storage unit 55 to confirm the presence of the customer's bank account as is described in the user authentication data. The result of this account confirmation is encrypted by the encryption unit 53 and sent back to the target bank system 30 as a confirmation response message.

[S4] In the target bank system 30, the decryption unit 32 decrypts the received confirmation response message to know the result of the account confirmation performed by the cooperative bank system 50. Based on the confirmation result, the account opening decision unit 34 determines whether to accept or to reject the application for the new bank account.

[S5] If the application is acceptable, then the process advances to step S6. Otherwise, the process skips the step S6.

[S6] The requested new account is created according to the account application information previously received from the terminal station 10, and this new account is registered to the account information storage unit 35.

[S7] Upon inquiry from the customer, the final result of the application is returned to the terminal station 10. More specifically, the encryption unit 33 encrypts the result status information to create an application response message. This message is transmitted to the terminal station 10 in response to the inquiry from the applicant (i.e., the customer). In the terminal station 10, the decryption unit 14 decrypts the application response message to extract the result status information. The output/storage unit 15 displays the extracted status information on a terminal screen.

Throughout the above-described process, every operation performed by the terminal station 10, target bank system 30, and cooperative bank system 50 is recorded in their respective log information storage units 16, 36, and 56.

Figure 4:
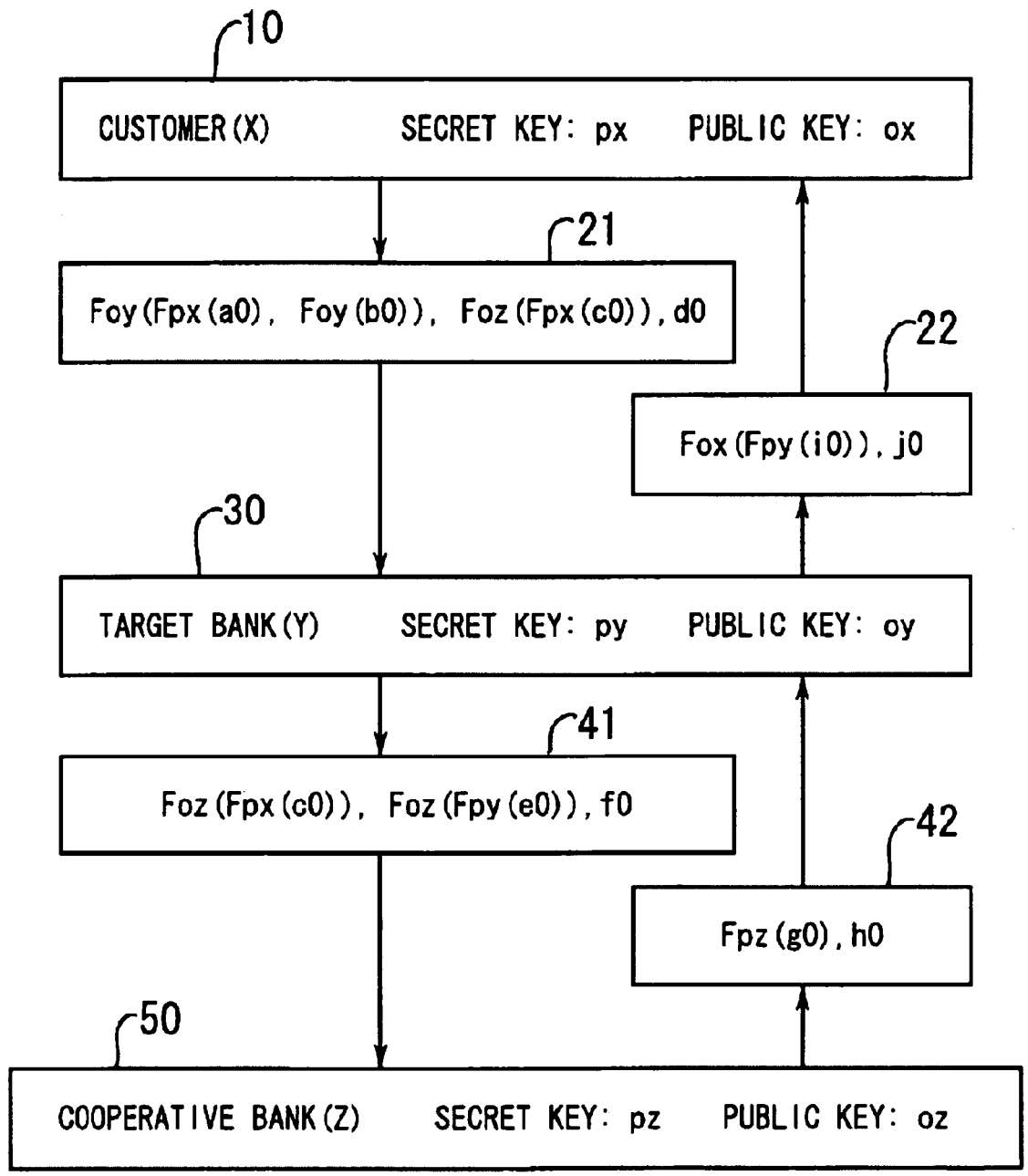
FIG. 4 is a diagram to explain a flow of encrypted information.

Referring next to FIG. 4, the following description will focus on how the information is exchanged among the terminal station 10, target bank system 30, and cooperative bank system 50 and how the security of the information is maintained.

FIG. 4 depicts a flow of encrypted information, where the RSA public-key encryption algorithm is widely adopted. In general, public-key cryptosystems use a pair of encryption/decryption keys, namely, a secret key and a public key. One of those keys is used to encrypt messages, which can be decrypted only by using the other key. For example, FIG. 4 shows that a customer secret key px and a customer public key ox are assigned to a customer X (i.e., the terminal station 10). Similarly, a target bank secret key py and a target bank public key oy are assigned to a target bank Y (i.e., the target bank system 30), while a cooperative bank secret key pz and a cooperative bank public key oz are assigned to a cooperative bank Z (i.e., the cooperative bank system 50).

Assume here that the customer X wishes to open a new account in the target bank Y. The customer X enters the following three classes of information to the terminal station 10.

a0: Name, address, company, target bank identification code, desired password of the new account, etc.

b0: Customer public key ox, cooperative bank identification code, etc.

c0: Cooperative bank identification code, account number and password of the existing bank account that is owned by the customer X, etc.

The first information a0 is encrypted by using the customer secret key px and then by using the target bank public key oy. The resultant ciphertext data can be expressed as Foy(Fpx(a0)), where Foy and Fpx are encryption functions corresponding to the encryption keys oy and px, respectively. Likewise, the second information b0 is encrypted by using the target bank public key oy, which results in a second ciphertext Foy(b0). The third information c0 is encrypted by using the customer secret key px and further by using the cooperative bank public key oz, thereby producing a third ciphertext Foz(Fpx(c0)). Lastly, the following plaintext d0 is combined with the above three kinds of ciphertext data.

d0: Code to define the message format, etc.

The above encryption process performed in the terminal station 10 will finally yield an account application message 21 which is expressed as

[Foy(Fpx(a0)), Foy(b0), Foz(Fpx(c0)), d0]

This account application message 21 is sent to the target bank system 30.

The target bank system 30 receives the account application message 21 and decrypts the encrypted information contained in the message. This decryption process is expressed as:

$\Gamma py(Foy(Fpx(a0))) \rightarrow Fpx(a0)$ $\Gamma py(Foy(b0)) \rightarrow b0$ where the character Γ (gamma) is used to represent a decryption operator such as Γpy for the decryption key py.

The target bank system 30 decrypts again the ciphertext Fpx(a0) by using the customer public key ox that is included in the information b0 just decrypted above. This second decryption yields the plaintext information a0 as $\Gamma ox(Fpx(a0)) \rightarrow a0$ where Γox represents the decryption function corresponding to the decryption key ox.

The third ciphertext Foz(Fpx(c0)) in the account application message, which contains the information c0 in encrypted form, cannot be processed in the target bank system 30 because it is encrypted with the cooperative bank public key oz (i.e., the secret key pz is necessary to decode it). For the time being, the target bank system 30 leaves this Foz(Fpx(c0)) as it is. Although it is not shown in FIG. 4, the target bank system 30 returns an acknowledgment message including a reception number to the terminal station 10, thereby indicating the reception of the account application message.

The target bank system 30 then composes a confirmation request message 41 addressed to the secret/public key generator 51. This message contains the following information e0 and f0 in addition to the encrypted information Foz(Fpx(c0)) received from the terminal station 10.

e0: Target bank identification code, customer public key ox, and confirmation request number f0: Code to define the message format While the latter information f0 is sent as plaintext data, the former information e0 is encrypted two times by using the target bank secret key py and the cooperative bank public key oz, thereby yielding ciphertext data Foz(Fpy(e0)). The confirmation request message 41 is thus expressed as follows.

[Foz(Fpx(c0)), Foz(Fpy(e0)), f0]

The cooperative bank system 50 receives this confirmation request message 41 and decodes the encrypted part of the message to extract their contents. More specifically, the cooperative bank system 50 uses the cooperative bank secret key pz for decryption as:

$\Gamma pz(Foz(Fpx(c0))) \rightarrow Fpx(c0)$ $\Gamma pz(Foz(Fpy(e0))) \rightarrow Fpy(e0)$ The cooperative bank system 50 then decrypts those two ciphertext data Fpx(c0) and Fpy(e0) by using the customer public key ox and target bank public key oy, respectively, and finally obtains the original plaintext information e0 and c0.

$\Gamma oy(Fpy(e0)) \rightarrow e0$ $\Gamma ox(Fpx(c0)) \rightarrow c0$

The decrypted information c0 contains the cooperative bank identification code, account number and password of the existing bank account that is owned by the customer X. With this information, the cooperative bank system 50 confirms whether or not the account number claimed by the customer X is registered in the account information storage unit 55 and whether or not the claimed password coincides with the registered password.

Upon completion of the account confirmation, the cooperative bank system 50 assembles a confirmation response message 42 including the following two sets of information.

g0: Result of the account confirmation, cooperative bank identification code, and confirmation request number h0: Code to define the message format First, the cooperative bank system 50 encrypts the information go by using the cooperative bank secret key pz, and then it attaches the information h0 without encryption. This results in a confirmation response message 42 assembled as follows.

[Fpz(g0), h0]

The confirmation response message 42 is transferred to the target bank system 30.

After that, the cooperative bank system 50 obtains a log file, in which the history of events and operations are recorded, and saves it into the log information storage unit 56. For security purposes, a password error counter is prepared for every registered account. In the case that a customer provided a correct account number but happened to enter a wrong password by mistake, the above-described process of account confirmation will detect a password error and increment the password error counter for security record.

In the target bank system 30, the confirmation response message 42 is decrypted by using the cooperative bank public key oz. As a result, the information g0 is obtained as $$\Gamma oz(Fpz(g0)) \rightarrow g0$$

where Γoz represents the decryption function corresponding to the decryption key oz.

Based on the decrypted information g0, the target bank system 30 verifies the identity of the sender of the confirmation response message 42. More specifically, the target bank system 30 compares the bank identification code as part of the decrypted information g0 with the known identification code of the cooperative bank Z. If the two codes agree with each other, the target bank system 30 understands that the received message is totally valid.

Next, the target bank system 30 decides whether to accept or reject the application for a new bank account, based on the result of the account confirmation. The basis of this decision resides in the information g0 extracted from the confirmation response message 42. Note that the confirmation request number contained in the confirmation request message 41 and that extracted from the confirmation response message 42 must be the same number. And only when the decrypted information g0 shows that the cooperative bank system 50 successfully confirmed the validity of the bank account claimed by the customer X, the target bank system 30 will decide to create a new account as requested by the customer X.

When opening an account for the customer X, the target bank system 30 creates a registration record concerning the newly opened bank account, which includes the name, address, customer public key ox, password for the new account, and the like. This record is sent to the account information storage unit 35 for registration.

Subsequently, the target bank system 30 assembles an application response message 22 which conveys the following information.

i0: Target bank identification code, result status of the application, reception number, etc.
j0: Code to define the message format The target bank system 30 encrypts this information i0 by using the target bank secret key py and customer public key ox, thereby yielding the ciphertext information Fox(Fpy(i0)). The target bank system 30 adds the information j0 as is to the ciphertext information Fox(Fpy(i0)) and finally obtains the application response message 22 as follows.

$$[Fox(Fpy(i0)), j0]$$

This application response message 22 is sent to the terminal station 10.

After sending the message, the target bank system 30 obtains a log file in which the history of events and operations are recorded, and saves it into the log information storage unit 36. The target bank system 30 then opens the new account for the applicant.

The terminal station 10 receives the application response message 22 and decrypts the encrypted information contained in the message. More specifically, the encrypted information Fox(Fpy(i0)) is decoded by using the customer secret key px as:

$$\Gamma px(Fox(Fpy(i0))) \rightarrow Fpy(i0)$$

Then the information Fpy(i0) is decrypted by using the target bank public key oy as:

$$\Gamma oy(Fpy(i0)) \rightarrow i0$$

Based on this decrypted information i0, the terminal station 10 verifies the identity of the sender of the application response message 22. More specifically, the terminal station 10 compares the bank identification code as part of the decrypted information i0 with the known identification code of the target bank Y. If the two codes agree with each other, the terminal station 10 recognizes that the received message is totally valid and allows the result information to be displayed on the terminal screen, printed out upon request, and/or stored in the terminal station 10. The history of events and operations during the above-described process is recorded in a log file. The terminal station 10 saves such a log file into the log information storage unit 16.

Figure 5:
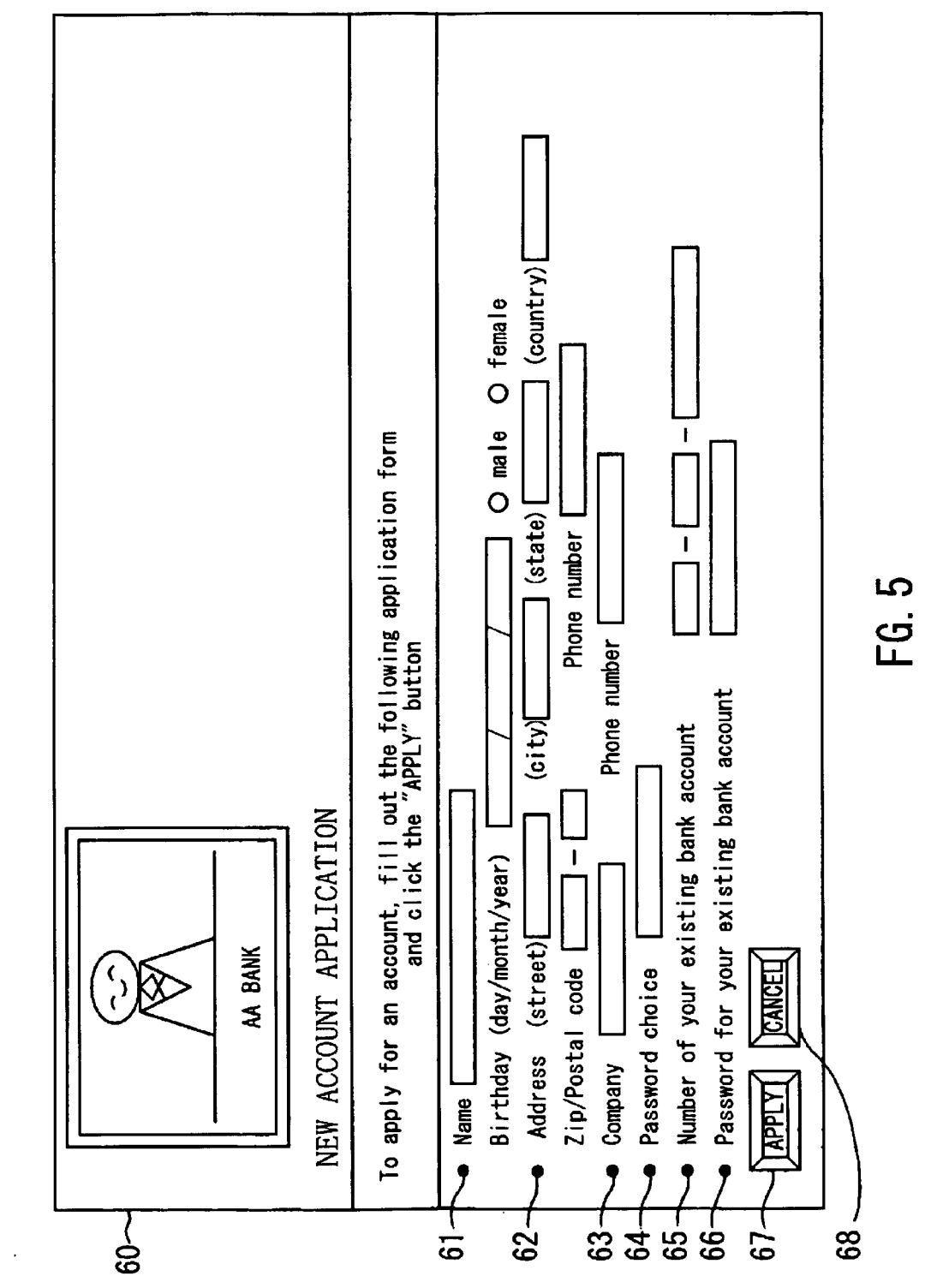

Referring next to FIG. 5, the following description will present an example of a terminal screen prepared for a customer who wishes to sign up for a new bank account.

FIG. 5 illustrates a terminal screen for online account application. When a customer connects the terminal station 10 to the target bank Y to sign up for a new account, the terminal station 10 will first show him/her a service menu screen. The user then selects an item titled "Opening Your New Account" from among the service menu items. In response to this selection, the terminal station 10 will display a submenu for the selected service menu item. The customer selects a submenu item titled "New Account Application," and then an account application screen 60 of FIG. 6 will appear on the terminal screen to prompt the customer to fill out an online application form.

The account application screen 60 has blank data fields 61–66 as part of the application form, where the user is requested to enter two classes of information; one is relevant to his/her new account to be opened and the other is relevant to his/her existing bank account.

The data fields that fall into the former category are: an input field 61 for the user's name and date of birth; field 62 for address and phone number; field 63 for company name and phone number; and field 64 for desired password for the new account. The information entered to those data fields 61–64 will be subject to encryption by using the customer secret key and target bank public key before it is transferred to the target bank system 30.

On the other hand, the remaining data fields 65 and 66, which fall into the latter category, are prepared respectively for account number and password of an existing bank account that is owned by the applicant. The account number must include the bank identification code and branch identification code to allow the account to be fully identified. The information entered to those two fields will be encrypted by using the customer secret key and cooperative bank public key when it is sent to the target bank system 30.

The application screen 60 further comprises an APPLY button 67 and a CANCEL button 68. When all the data fields 61–66 in the application form are completed, the customer will click the APPLY button 67 to initiate a transaction for opening a new account. The CANCEL button 68 is used to cancel the current session of online account application.

Assume that the customer has filled out the form in the account application screen 60. A mouse click on the APPLY button will submit the entered information to the target bank system 30. Upon receipt of this account application information, the target bank system 30 returns an acknowledgment message including a reception number to notify the terminal station 10 of the reception of the application submitted. The target bank system 30 then sends a request message to the cooperative bank system 50 to verify the identity of the applicant. This request message is, in other words, a user authentication request. If the user authentication performed by the cooperative bank system 50 has lead an affirmative decision for the account application, the target bank system 30 opens the requested account and saves registration data of the new account. Here, the terminal station 10 can make an inquiry about the current status of the application by sending the reception number that is received as part of the acknowledgment message. The target bank system 30 returns the registration data of the account in response to this inquiry. The following description will present an example screen in such a situation.

Figure 6:
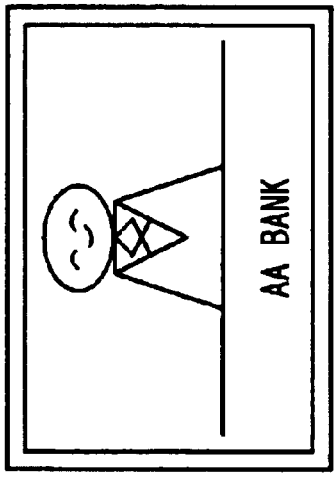
FIG. 6 is a diagram showing an example of a status inquiry screen to report the result of the new account application.

FIG. 6 illustrates a status inquiry screen that will appear in response to a request for opening a new account. Recall that the selection of the service menu item "Opening Your New Account" invokes a corresponding submenu. In addition to the item "New Account Application" explained above, this submenu also includes an item titled "Application Status Inquiry." The customer selects this submenu item and enters the reception number that he/she received from the target bank system 30 as part of the acknowledgment message corresponding to his/her new account application. Then the terminal station 10 displays an application status screen 70.

This application status screen 70 contains an account name field 71 and an account number field 72. The account number field 72 shows the number of the newly opened account that is taught by the target bank system 30.

While the above discussion have focused on such a case that a customer applies for an account of a specific bank for the first time, the following description will cover some different cases. More specifically, a customer may apply for another account of the same bank where his/her old account exists. Once the customer gets such a cyberspace bank account, he/she will be able to use various online banking services through the open networks. The following discussion will also clarify how the present invention will provide a customer with secure services.

Figure 7:
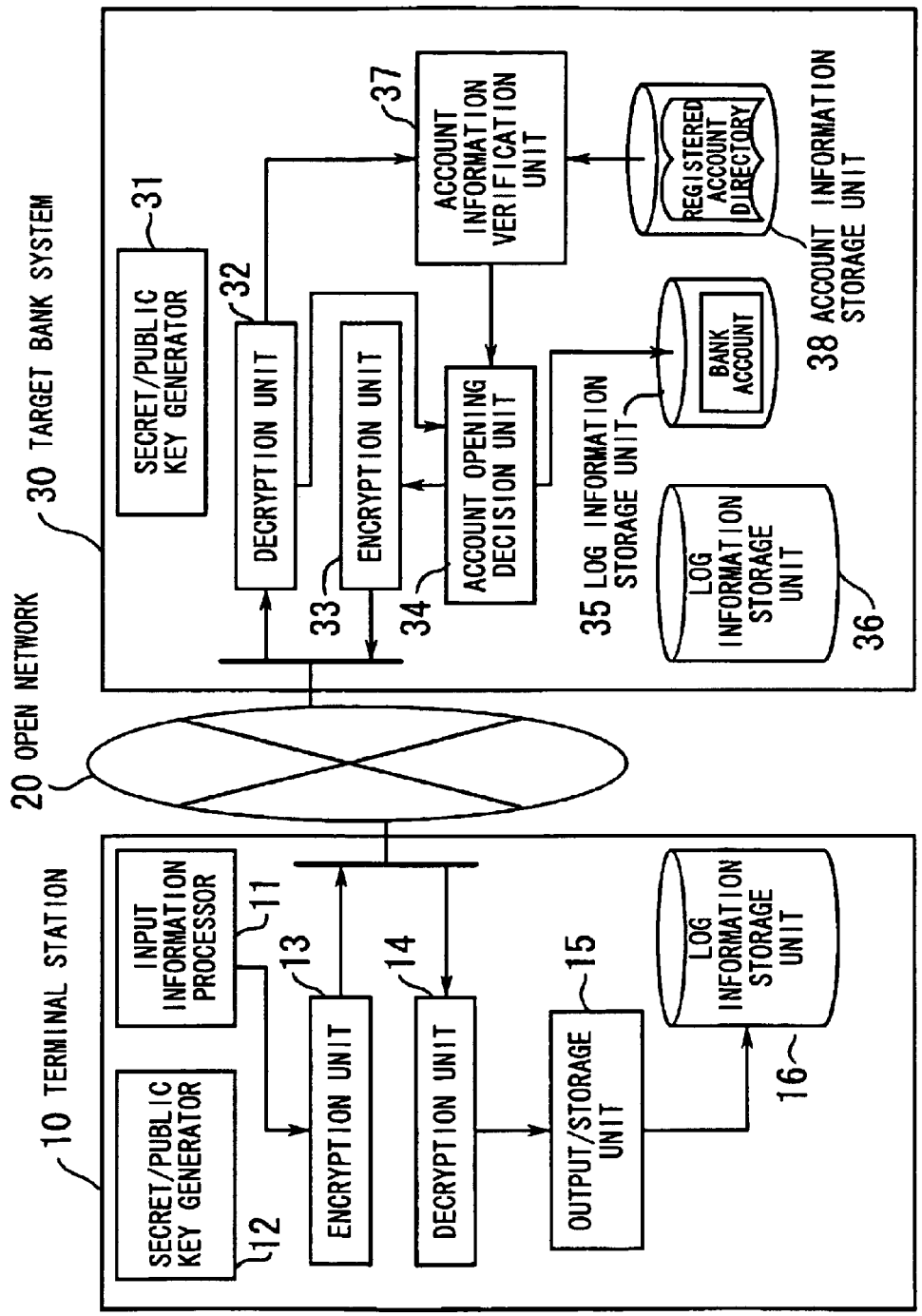
FIG. 7 is a block diagram shows another typical configuration of a cyberspace banking system where the network transaction system of the present invention is implemented.

FIG. 7 shows an alternate configuration of a cyberspace banking system where the network transaction system of the present invention is implemented. Because of its similarity to the configuration of FIG. 2, like reference numerals are assigned to like elements.

In this cyberspace banking system, a terminal station 10 at the customer's site is connected via an open network 20 to a target bank system 30. The customer already has an account in the target bank but he/she wishes to open another account in the same bank.

The terminal station 10 comprises an input information processor 11, a secret/public key generator 12, an encryption unit 13, a decryption unit 14, an output/storage unit 15, and a log information storage unit 16. The input information processor 11 processes information entered by the customer. The secret/public key generator 12 produces a customer secret key and a customer public key. The encryption unit 13 encrypts the entered information and sends the encrypted message to the target bank system 30. The decryption unit 14 receives response messages from the target bank system 30 and decrypts them to allow the output/storage unit 15 to display, print out, and/or store the information contained in the messages. The log information storage unit 16 records the operation history of the terminal station 10.

The target bank system 30 comprises a secret/public key generator 31, a decryption unit 32, an encryption unit 33, an account opening decision unit 34, an account information storage unit 35, a log information storage unit 36, an account information verification unit 37, and an account information storage unit 38. The secret/public key generator 31 creates a target bank secret key and a target bank public key. The decryption unit 32 decrypts a request message received from the terminal station 10. The encryption unit 33 encrypts a response message and sends it to the terminal station 10. The account opening decision unit 34 decides whether to accept or to reject a customer's request for a new account. The account information storage unit 35 stores information on the registered bank accounts. The log information storage unit 36 records the operation history in the target bank system 30. The account information verification unit 37 confirms the validity of the bank account that the customer claims to own. The account information storage unit 38 stores information regarding the registered bank accounts.

When applying for a new account, the input information processor 11 in the terminal station 10 prompts the customer to enter the following three sets of information.

a1: Name, address, company, target bank identification code, password choice for the new account, account number and password of the existing bank account that is owned by the customer, etc.

b1: Customer public key ox d1: Code to define the message format, etc.

The encryption unit 13 encrypts the first information a1 by using the customer secret key px and further by using the target bank public key oy. The resultant first ciphertext is expressed as Foy(Fpx(a1)). Likewise, the encryption unit 13 encrypts the second information b1 by using the target bank public key oy, thus yielding second ciphertext data Foy(b1). Lastly, the third information d1 is combined with the above two sets of ciphertext data. As a result, an account application message 21 is assembled as $$[\text{Foy}(\text{Fpx}(a1)), \text{Foy}(b1), d1].$$

This account application message 21 is sent to the target bank system 30.

The target bank system 30 receives the account application message 21, and the decryption unit 32 decrypts the encrypted information contained in the message by using the target bank secret key py. This decryption process is expressed as $$\Gamma py(\text{Foy}(\text{Fpx}(a1))) \rightarrow \text{Fpx}(a1),$$

$$\Gamma py(\text{Foy}(b1)) \rightarrow b1.$$

The decryption unit 32 further decrypts the ciphertext Fpx (a1) by using the customer public key ox as part of the decrypted information b1, thereby yielding the plaintext information a1 as $$\Gamma ox(\text{Fpx}(a1)) \rightarrow a1.$$

The decrypted information a1 contains the account number and password of the existing bank account that is owned by the customer. This information is sent to the account information verification unit 37 for confirmation. The account information verification unit 37 confirms that the account number claimed by the customer is registered in the account information storage unit 38 and that the claimed password coincides with the registered password. The result of this confirmation is reported to the account opening decision unit 34 to decide whether to accept or to reject the application for a new bank account. If it decides to accept the application, the registration data of the new account is saved into the account information storage unit 35.

When the target bank system 30 receives an inquiry about the application status from the customer, the encryption unit 33 assembles an application response message based on the result of the existing account confirmation. The application response message will convey the following information.

i1: Target bank identification code, result status of the application, reception number, etc.

j1: Code to define the message format

The encryption unit 33 encrypts this information i1 by using the target bank secret key py and further by using the customer public key ox. The encryption unit 33 adds the information j1 to the ciphertext information Fox(Fpy(i1)) and finally assembles the application response message as

[Fox(Fpy(i1)), j1].

This application response message is sent to the terminal station 10 in reply to the inquiry.

The terminal station 10 receives the application response message, and the decryption unit 14 decrypts the encrypted information contained in the message. More specifically, the encrypted information Fox(Fpy(i1)) is decoded by using the customer secret key px as Γpx(Fox(Fpy(i1)))→Fpy(i1).

Further, the decryption unit 14 decrypts the information Fpy(i1) using the target bank public key oy as Γoy(Fpy(i1))→i1.

By displaying this decrypted information i1 on the terminal screen, the output/storage unit 15 reports the current status of the account application to the customer.

The next description will explain how the customer makes transactions with his/her bank account through online banking services.

Transactions are initiated by selecting an item "Home Banking" from among those listed in the initial service menu on the screen of the terminal station 10. Responding to this selection, the input information processor 11 prompts the customer to enter the following information a2.

a2: Account number and password of the bank account that is owned by the customer and the kind of service requested The encryption unit 13 encrypts this information a2 by using the customer secret key px and the target bank public key oy, thereby obtaining first ciphertext data Foy(Fpx(a2)). The encryption unit 13 also encrypts the following information b2 using the target bank public key oy, and yields second ciphertext data Foy(b2).

b2: Customer public key ox

Lastly, the following plaintext d2 is combined with the above two kinds of ciphertext data.

d2: Code to define the message format, etc.

The resultant service request message is expressed as

[Foy(Fpx(a2)), Foy(b2), d2], which service request message is sent to the target bank system 30.

In the target bank system 30, the decryption unit 32 decrypts the received service request message. More specifically, the decryption unit 32 first uses the target bank secret key py for decryption as Γpy(Foy(Fpx(a2)))→Fpx(a2), Γpy(Foy(b2))→b2.

Subsequently, the decryption unit 32 decrypts the ciphertext Fpx(a2) by using the customer public key ox as Γox(Fpx(a2))→a2.

The decrypted information a2 contains the account number and password of the existing bank account that is owned by the customer, which information is sent to the account information verification unit 37 for confirmation. The account information verification unit 37 confirms that the account number claimed by the customer is registered in the account information storage unit 38 and that the claimed password coincides with the registered password. The result of this confirmation is reported to a service processor (not shown in FIG. 7) in the target bank system 30. The service processor evaluates the confirmation result, and if the result was affirmative, the service processor provides the requested service after parsing the contents of the decrypted information a2. The available services include account balance summary, transaction history, and fund transfer, and the like. The output of the service processor is sent to the encryption unit 33.

Upon receipt of an inquiry of the current status of service transaction, the encryption unit 33 assembles a response message to be returned to the customer. More specifically, the encryption unit 33 prepares the following information i2 and j2.

i2: Target bank identification code, result status of the service request, reception number, etc.

j2: Code to define the message format

The encryption unit 33 encrypts the information i2 by using the target bank secret key py and customer public key ox, thereby yielding the ciphertext information Fox(Fpy(i2)). The encryption unit 33 adds the information j2 as is to the ciphertext Fox(Fpy(i2)) and finally obtains a response message expressed as

[Fox(Fpy(i2)), j2], and this response message is transmitted to the terminal station 10.

The decryption unit 14 in the terminal station 10 decrypts the encrypted information contained in the received response message. More specifically, the encrypted information Fox(Fpy(i2)) is decoded by using the customer secret key px as Γpx(Fox(Fpy(i2)))→Fpy(i2), and this ciphertext information Fpy(i2) is further decrypted by using the target bank public key oy as Γoy(Fpy(i2))→i2.

Based on this decrypted information i2, the output/storage unit 15 displays the result of his/her service request.

The above discussion will be summarized as follows. In a cyberspace banking system based on an open computer network, user authentication is a vital process for security. When applying for a new bank account, a customer is required to show that he/she is the exact person who he/she claims to be. The present invention makes this user authentication process much easier, by using the applicant's existing bank account as a kind of certificate. Inter-bank financial networks makes it possible to verify the validity of a remote account. When the applicant's remote account was successfully confirmed, it implies that the applicant has once passed the authentication process in that bank. The idea of using the existing inter-bank networks to confirm the identities of customers will allow the authentication process to be greatly simplified and thus enable the customers to fully enjoy the cyberspace banking services of any banks they desire. The present invention also eliminates the need of user registration to certifying authorities, as well as allowing the banks to be free from operations and management pertaining to such certifying authorities. This will be of great benefit to both customers and banks.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network transaction system in which a customer's terminal station is connected to a first bank system via an open network and the first bank system is connected to a second bank system via an inter-network, the customer having an existing bank account in the second bank system and attempting to newly open a bank account in the first bank system, the network transaction system comprising:

customer processing means disposed at the terminal station and coupled to the open network, said customer processing means for applying for a new bank account by supplying via the open network the first bank system with existing account information descriptive of the existing bank account owned by the customer in the second bank system;

first bank processing means disposed at the first bank system and coupled to the open network and inter-networks, said first bank processing means for requesting via the inter-networks the second bank system to make a confirmation of the existing bank account while forwarding the existing account information received from the customer processing means to the second bank system over the inter-network, and for opening the applied new bank account based on a confirmation response message received via the inter-network from the second bank system describing a result of the confirmation of the existing bank account, wherein the first bank processing means authenticates the customer based on the confirmation; and second bank processing means disposed at the second bank system and coupled to the inter-network, said second bank processing means for confirming validity of the existing bank account upon request from said first bank processing means, and for returning the confirmation response message to said first bank processing means to report the result of the confirmation of the existing bank account, wherein said customer processing means comprises:

(a1) customer key generation means for generating a customer secret key and a customer public key, (a2) customer encryption means for assembling an account application message to be sent to said first bank processing means by:

encrypting account application information necessary for opening the new bank account by using the customer secret key and further by using a first bank public key, encrypting the customer public key and a second bank identification code by using the first bank public key, encrypting the existing account information by using the customer secret key and further by using a second bank public key, and combining the encrypted account application information, the encrypted customer public key, the encrypted second bank identification code, and the encrypted existing account information, and (a3) customer decryption means for obtaining new account acknowledgment information by decrypting an application response message received from said first bank processing means by using the customer secret key and further by using the first bank public key.

2. A network transaction system according to claim 1, wherein said first bank processing means comprises:

(b1) first bank key generation means for generating a first bank secret key and the first bank public key, (b2) first bank decryption means for:

obtaining the customer public key and the second bank identification code by decrypting the encrypted customer public key and the encrypted second bank identification code, as part of the account application message received from said customer processing means, by using the first bank public key, obtaining the account application information by decrypting the encrypted account application information, as part of the account application message received from said customer processing means, by using the first bank secret key and further by using the obtained customer public key, and obtaining the result of the confirmation of the existing bank account by decrypting the confirmation response message from the second bank processing means by using the second bank public key, and (b3) first bank encryption means for:

encrypting confirmation request information by using the second bank public key, and assembling a confirmation request message to be sent to said second bank processing means by combining the encrypted confirmation request information and the encrypted existing account information received from the customer processing means, wherein the confirmation request information includes a first bank identification code, the customer public key, and a confirmation request number.

3. A network transaction system according to claim 2, wherein said second bank processing means comprises:

(c1) second bank key generation means for generating a second bank secret key and the second bank public key, (c2) second bank decryption means for:

obtaining the first bank identification code, the customer public key, and the confirmation request number by decrypting the encrypted confirmation request information by using the second bank secret key and further by using the first bank public key, and obtaining the existing account information by decrypting twice the encrypted existing account information by using the second bank secret key and further by using the above-obtained customer public key, and (c3) second bank encryption means for encrypting the result of the confirmation of the existing bank account, the second bank identification code, and the confirmation request number by using the second bank secret key, and thereby assembling the confirmation response message to be sent to said first bank processing means.

4. A user authentication method for cyberspace banking services of an open network, which banking services are provided by a plurality of banks interconnected via an inter-bank network, the plurality of banks including a first bank and a second bank, a customer having an existing bank account in the second bank and newly issuing an account application for a bank account in the first bank, the user authentication method comprising:

(a) being supplied by the customer via the open network with first information which is obtained by encrypting account application information necessary for opening a new bank account by using a customer secret key and further by a first bank public key;

(b) being supplied by the customer via the open network with second information which is obtained by encrypting a customer public key and a second bank identification code by using the first bank public key;

(c) being supplied by the customer via the open network with third information which is obtained by encrypting existing account information by using the customer secret key and further by using a second bank public key, wherein the existing account information is descriptive of the existing bank account owned by the customer in the second bank;

(d) decrypting the second information by using the first bank secret key to obtain the customer public key and the second bank identification code;

(e) decrypting the first information by using the first bank secret key and further by using the decrypted customer public key to obtain the account application information;

(f) encrypting the second bank identification code, the customer public key, and confirmation request information by using the second bank public key to obtain fourth information;

(g) sending via the inter-bank network the third information and the fourth information to the second bank, thereby requesting via the inter-bank network the second bank to authenticate the customer based on the existing account information contained in the third information;

(h) receiving via the inter-bank network a response from the second bank that reports the result of the authentication; and (i) deciding whether to accept or to reject the account application from the customer.

5. A user authentication method for cyberspace banking services of an open network, which are provided by a bank where customer has an existing bank account, the user authentication method comprising:

(a) being supplied by the customer via the open network with first information which is produced by encrypting account application information and existing account information by using a customer secret key and further by a bank public key, wherein the account application information is information necessary for opening a new bank account and the existing account information is descriptive of the existing bank account owned by the customer in the bank;

(b) being supplied by the customer via the open network with second information which is produced by encrypting a customer public key by using the bank public key;

(c) decrypting the second information by using the bank secret key, thereby obtaining the customer public key;

(d) decrypting the first information by using the bank secret key and further by using the customer public key obtained in the step (c), thereby extracting the account application information and the existing account information;

(e) authenticating by an account information verification unit of the bank the customer's identity, based on the existing account information extracted in the step (d); and (f) deciding by an account opening decision unit of the bank whether to accept or to reject the account application from the customer, based on the result of the authentication performed in the step (e).

6. A user authentication method for cyberspace banking services of an open network, which are provided by a bank where customer has an existing bank account, the user authentication method comprising:

(a) being supplied by the customer via the open network with first information which is produced by encrypting service request information and existing account information by using a customer secret key and further by a bank public key, wherein the service request information specifies service contents pertaining to the existing bank account and the existing account information is descriptive of the existing bank account owned by the customer in the bank;

(b) being supplied by the customer via the open network with second information which is produced by encrypting a customer public key by using the bank public key;

(c) decrypting the second information by using the bank secret key to obtain the customer public key;

(d) decrypting the first information by using the bank secret key and further by using the customer public key obtained in the step (c) so as to extract the service request information and the existing account information;

(e) authenticating by an account information verification unit of the bank the customer's identity, based on the existing account information extracted in the step (d); and (f) deciding by an account opening decision unit of the bank whether to provide or not the service contents to the customer, based on the result of the authentication performed in the step (e).

* * * * *